United States Patent

[11] 3,625,919

[72] Inventors Hiroyoshi Kamogawa
 809, Mizonokuchi, Kawasaki-shi;
 Masao Kato, 955-10, Shimonagaya-cho-
 Sherigaya, Minami-ku, Yokohama,
 both of Japan
[21] Appl. No. 703,864
[22] Filed Feb. 8, 1968
[45] Patented Dec. 7, 1971
[32] Priority Feb. 10, 1967
[33] Japan
[31] 42/8719

[54] PROCESS FOR THE PREPARATION OF DIAZOTIZED VINYLPHENOL POLYMERS HAVING PHOTOTROPIC PROPERTIES
 9 Claims, No Drawings

[52] U.S. Cl.................................................. 260/47 U,
 96/91
[51] Int. Cl..................................................... C08f 7/10
[50] Field of Search........................................... 260/47 U,
 141, 93.5 A; 96/91

[56] References Cited
 UNITED STATES PATENTS

| | | | |
|---|---|---|---|
| 2,694,693 | 11/1954 | Minsk............................ | 260/47 |
| 3,230,087 | 1/1966 | Sus................................ | 96/33 |
| 3,357,968 | 1/1967 | Wilbert......................... | 260/156 |
| 2,274,551 | 2/1942 | Kenyon......................... | 260/152 |
| 2,415,382 | 2/1947 | Woodward.................... | 95/7 |
| 2,455,169 | 11/1948 | Glass............................. | 95/6 |
| 2,911,387 | 11/1959 | Vandenberg................. | 260/47 |

*Primary Examiner*—Joseph L. Schofer
*Assistant Examiner*—C. A. Henderson, Jr.
*Attorney*—Ernest G. Montague

ABSTRACT: Polymers having optical specificity which have a saturated hydrocarbon polymer chain and pendant phenol groups which are the coupled reaction products of phenol and a diazonium salt. These polymers may be prepared by coupling a diazonium salt with vinylphenol and then copolymerizing with at least one vinyl compound. Alternatively, a homopolymer formed from the vinylphenol monomer or a copolymer formed from the vinylphenol monomer with another vinyl monomer are reacted with a diazonium salt to couple said salt with the phenol groups.

PROCESS FOR THE PREPARATION OF DIAZOTIZED VINYLPHENOL POLYMERS HAVING PHOTOTROPIC PROPERTIES

BACKGROUND OF THE INVENTION

This invention relates to a process for the preparation of polymers having phototropic properties.

It was well known that various aminoazobenzene and hydroxyazobenzene derivatives exhibit phototropic properties. Many studies were made on the use of these substances having such properties as photofilters, but such use has not yet been realized in the industry. When an organic substance having phototropic properties is polymerized into a high-molecular substance, the uniformity of distribution, transparency and antisolvent characteristics of the substance in a solid state are extremely superior to those of conventional high-molecular substances in which a lower molecular compound is merely blended.

The object of this invention is to provide a process for easily preparing a polymer having phototropic properties.

SUMMARY OF THE INVENTION

The process of this invention comprises reacting vinylphenol as the starting material with a diazonium salt to produce a monomer or a polymer and, in the case of the monomer, further polymerizing said monomer to produce a high-molecular substance having phototropic properties.

The production of the monomer can be carried out by dissolving o-vinylphenol or m-vinylphenol in water having dissolved therein more than 1.2 moles of sodium hydroxide or potassium hydroxide per 1 mole of the vinylphenol and thereafter adding a diazonium solution, while cooling below 5° C. and stirring, thereby effecting a diazo-coupling reaction. The above diazonium salt solution can be prepared by mixing, at a temperature below 5° C., a solution consisting of 2 moles of hydrochloric acid and 1 mole of aniline, methyl aniline such as o-toluidine, m-toluidine, p-toluidine, 3,5-dimethylaniline or 3,4,5-trimethylaniline, chloraniline such as o-chloroaniline, m-chloroaniline, p-chloroaniline, 3,5-dichloroaniline or 3,4,5-trichloroaniline, α-naphthylamine, or β-naphtylamine, with an aqueous solution of 1 mole of sodium nitrate.

The mixture is then further stirred for about 1 hour and, when the monomer thus produced is alkali-soluble, is diluted with water and filtered. The monomer is then precipitated from the filtrate by adding solid carbon dioxide to the filtrate or by making it neutral with a weak organic acid such as lactic acid or acetic acid. When the above product is alkali-insoluble, the solution is neutralized with solid carbon dioxide or the above-mentioned weak organic acid, filtering off the precipitate, extracting the filtrate with hot alcohol or other solvent and diluting the extract with water.

The monomer thus obtained can then be purified by crystallization from benzene, alcohol, or a mixture of benzene and ligroin or petroleum ether.

The monomer obtained by the above procedure is then copolymerized with an appropriate vinyl compound such as methyl acrylate, ethyl acrylate, tert-butyl acrylate, methyl methacrylate, vinyl acetate, acrylonitrile, vinyl chloride, styrene, ethyl vinyl ether, methyl vinyl ether, ethyl vinyl ether and butyl vinyl ether, in the presence of a radical polymerization initiator, for example, azobis-isobutyronitrile or phenylazo-triphenylmethane, dissolved in a solvent such as dioxane, tetrahydrofuran, ethanol, acetone, methyl ethyl ketone, benzene, or the like, under oxygen-free conditions to obtain a polymer, which is then purified by the reprecipitation method.

The polymer thus obtained exhibits phototropic properties in its benzene solution or in a film state.

O-vinylphenol or m-vinylphenol can also be polymerized by using a solution of the above radical polymerization initiator in dioxane, tetrahydrofuran, ethanol, acetone, methyl ethyl ketone, or benzene, etc. under oxygen-free conditions to obtain polyvinylphenol. The polyvinylphenol is then dissolved in an alkali solution by the same procedure as described for the production of the monomer, and thereafter the same diazonium salt solution as above is added dropwise thereto while stirring at a temperature below 5° C. to effect diazo-coupling. The reaction mixture is further stirred for about 1 hour and neutralized to obtain a precipitate of the polymer, which is then purified by the reprecipitation method.

The polymer thus obtained also exhibits the same phototropic properties as those obtained by the copolymerization.

The polymers which can be used as the starting material may be those obtained by the radical polymerization of two copolymerizable substances including vinylphenol and a water-soluble monomer such as acrylic acid, methacrylic acid, etc., or three copolymerizable substances including vinylphenol, the above water-soluble monomer and a vinyl compound such as vinyl ether, vinyl chloride, styrene, etc.

DESCRIPTION OF PREFERRED EMBODIMENTS

The following examples are further illustrative of this invention, and it will be understood that the invention is not limited thereto.

EXAMPLE 1

A solution of 5.18 (0.040 mole) of aniline hydrochloride dissolved in 50 cc. of 1 percent hydrochloric acid and a solution of 2.76 g. (0.040 mole) of sodium nitrite dissolved in 30 cc. of water were mixed together at 1° C. to prepare a diazonium salt solution. Separately, a solution of 4.81 g. (0.040 mole) of o-vinylphenol dissolved in 400 cc. of water containing 10 g. of sodium hydroxide was prepared and to this was added dropwise the above diazonium salt solution while cooling with ice to 5° C. and stirring. The mixture was then further stirred for 1 hour and thereafter filtered. Solid carbon dioxide was added to the filtrate to obtain a deep orange precipitate of benzeneazo-o-vinylphenol (yield, 57 percent). The precipitate was separated by filtration, dried under reduced pressure and recrystallized from a benzene-ligroin (1:1) mixed solution to obtain glossy orange-yellow crystals. Melting point, 105°–106° C., N, 12.41 percent (calculated value, 12.48 percent).

EXAMPLE 2

A solution consisting of 1 part of the monomer prepared in example 1, 5 parts of methyl methacrylate, 5 parts of ethyl acrylate, 0.1 part of azobis-isobutyronitrile and 20 parts of tetrahydrofuran was subjected to polymerization at 70° C. for 42 hours under oxygen-free conditions, and the resulting solution was diluted with an acetone-methanol mixed solution and poured into water to separate a yellow-orange polymer (CP-1) (yield, 95 percent). The same working-up procedure as above was repeated several times to purify the polymer.

EXAMPLE 3

A solution of 6.56 g. (0.040 mole) of p-chloroaniline hydrochloride dissolved in 50 cc. of 1 percent hydrochloric acid and a solution of 2.76 g. (0.040 mole) of sodium nitrite dissolved in 30 cc. of water were mixed together at 1° C. to prepare a diazonium salt solution. Separately, a solution of 4.81 g. (0.040 mole) of o-vinylphenol dissolved in 400 cc. of water containing 10 g. of sodium hydroxide was prepared and to this was added dropwise the above diazonium salt solution while cooling with ice to 5° C. and stirring. The mixture was then further stirred for 1 hour, followed by the addition of solid carbon dioxide to form a yellow-brown precipitate, which was separated by filtration, washed with water and extracted four times with a 100 cc. portion of hot ethanol. Five hundred cc. of water was added to the extract to form a brown precipitate at first, which was rapidly separated by filtration. An additional 500 cc. of water was added to the filtrate, which was then allowed to stand to crystallize a yellow-orange crystalline precipitate of p-chlorobenzene-o-vinylphenol (yield, 31 percent). The precipitate was separated by filtration and recrystallized from a benzene-ligroin 1:1) mixed solution to give golden-color crystals. Melting point, 134°–135° C., N, 10.75 percent (calculated value, 10.83 percent).

EXAMPLE 4

In the same manner as example 2, a yellow-orange polymer (CP-2) was obtained by using the monomer prepared in example 3. Yield, 93 percent.

EXAMPLE 5

A solution of 5.74 g. (0.040 mole) of p-toluidine hydrochloride dissolved in 50 cc. of 1 percent hydrochloric acid and a solution of 2.76 percent (0.040 mole) of sodium nitrite dissolved in 30 cc. of water were mixed together at 1° C. to prepare a diazonium salt solution which was then added dropwise to a solution of 4.81 g. (0.040 mole) of o-vinylphenol dissolved in 400 cc. of water containing 10 g. of sodium hydroxide. The mixture was then worked up in the same manner as example 1 to obtain a yellow-brown precipitate of p-tolueneazo-o-vinylphenol. The precipitate was recrystallized from a benzene-ligroin (1:1) mixed solution to give grossy red-brown crystals. Melting point, 138°–139° C., N, 11.5 percent (calculated value, 11.76 percent).

EXAMPLE 6

In the same manner as example 2, a yellow-orange polymer (CP-3) was obtained by using the monomer prepared in example 5. Yield, 95 percent.

EXAMPLE 7

A solution of 10.8 g. (0.083 mole) of aniline hydrochloride dissolved in 100 cc. of 1 percent hydrochloric acid and a solution of 5.8 g. (0.083 mole) of sodium nitrite dissolved in 50 cc. of water were mixed together at 1° C. to prepare a diazonium salt solution. Separately, a solution of 10.0 g. (0.083 mole) of poly-o-vinylphenol ($[\nu]$=0.114) dissolved in 600 cc. of water containing 25 g. of sodium hydroxide was prepared and to this was added dropwise the above diazonium salt solution while cooling with ice to 5° C. and stirring. The mixture was then further stirred for 1 hour and thereafter is made neutral with hydrochloric acid to form a brown precipitate of the polymer (HP-1) which was then separated by filtration, washed with water and dried. The polymer was then purified by dissolving it in tetrahydrofuran and precipitating it again from water. Extent of the reaction 88 percent.

EXAMPLE 8

A solution of 13.6 g. (0.083 mole) of p-chloroaniline hydrochloride dissolved in 100 cc. of 1 percent hydrochloric acid and a solution of 5.8 g. (0.083 mole) of sodium nitrite dissolved in 50 cc. of water were mixed together at 1° C. to prepare a diazonium salt solution which was then added dropwise to a solution of 10.0 g. (0.083 mole) of poly-o-vinylphenol ($[\nu]$=0.114) dissolved in 600 cc. of water containing 25 g. of sodium hydroxide while stirring 5° C. The resulting mixture was then worked up in the same manner as example 7 to give a brown polymer (HP-2). Extent of the reaction, 86 percent.

EXAMPLE 9

A solution of 11.9 g. (0.083 mole) of p-toluidine hydrochloride dissolved in 100 cc. of 1 percent hydrochloric acid and a solution of 5.8 g. (0.083 mole) of sodium nitrite dissolved in 50 cc. of water were mixed together at 1° C. to prepare a diazonium salt solution which was then added dropwise to a solution of 10.0 g. (0.083 mole) of poly-o-vinylphenol ($[\nu]$=0.114) dissolved in 600 cc. of water containing 25 g. of sodium hydroxide while stirring at 5° C. The resulting mixture was then worked up in the same manner as example 7 to give a brown polymer (HP-3). Extent of the reaction 86 percent.

EXAMPLE 10

The polymers, CP-1, CP-2 and CP-3, prepared in examples 2, 4 and 6 respectively were separately dissolved in benzene to prepare the respective solutions having a concentration of 0.0800 g/l. The solution were allowed to stand in a dark place for 24 hours, and thereafter measured for the absorption curve in the range of 250–500 m$\mu$ by a spectrophotometer using a 1.00 cm. quartz cell to determine the $\lambda$ max. The cell was then irradiated on its side plane with light from a 100-watt tungsten lump through a rotatory shutter to measure the absorption curve, and the phototropic properties (trans form → cis form) induced by the irradiation were evaluated by observing the variation in absorption intensity at the $\lambda$ max and the isosbestic points of the absorption curves. The results were as shown in table 1 below. As is clear from the values of the extinction coefficient (absorbancy index) ratio $\xi_2/\xi_1$, the polymer in each case indicated the phototropic properties.

TABLE 1

| Sample No. | $\lambda_{max}$ (m$\mu$) | 1. After allowed to stand in a dark place | | 2. After irradiated | | | Isosbestic points of the absorption curves 1 and 2 (m$\mu$) |
|---|---|---|---|---|---|---|---|
| | | Log $I_1/I_0$ | $\xi_1$(l./g.) | Log $I_2/I_0$ | $\xi_2$(l./g.) | $\xi_2/\xi_1$ | |
| CP-1 | 355 | −0.5436 | 6.80 | −0.3925 | 4.91 | 0.72 | 307, 414 |
| CP-2 | 362 | −0.4908 | 6.14 | −0.3170 | 3.96 | 0.64 | 313, 424 |
| CP-3 | 357 | −0.4461 | 5.58 | −0.3188 | 3.99 | 0.72 | 311, 416 |

EXAMPLE 11

The same polymers, CP-1, CP-2 and CP-3, as used in example 10 were separately dissolved in benzene, and each of the resulting solutions was evenly applied to the surface of a glass plate to form a film thereon. Benzene was then evaporated by allowing the glass plate to stand for 2 days in a dark place to prepare a sample. The sample was then fixed on a spectrophotometer so as to be exposed to the light irradiated (excited) at a 45° angle, and was measured in the same way as in example 10 in the range of 340–500 m$\mu$. The results were shown in table 2 below. As is clear from the values of $\xi_2/\xi_1$, the polymer in each case indicated the phototropic properties.

TABLE 2

| Sample No. | $\lambda_{max}$ (m$\mu$) | 1. After allowed to stand in a dark place | 2. After irradiated | | Isosbestic points of the absorption curves 1 and 2 (m$\mu$) |
|---|---|---|---|---|---|
| | | Log $I_1/I_0$ | Log $I_2/I_0$ | $\xi_2/\xi_1$ | |
| CP-1 | 358 | −0.4112 | −0.3279 | 0.80 | 420 |
| CP-2 | 368 | −0.3883 | −0.3054 | 0.79 | 428 |
| CP-3 | 359 | −0.4145 | −0.3391 | 0.82 | 426 |

EXAMPLE 12

The polymers, HP-1, HP-2 and HP-3, prepared in examples 7, 8 and 9, respectively were separately mixed with polystyrene, and each of the mixtures was dissolved in tetrahydrofuran. The resulting solutions were worked up in the same manner as example 11 to prepare samples, which were then measured in the same manner as in example 11. The results were as shown in table 3 below. As is clear from the values of $\xi_2/\xi_1$, the polymer in each case indicated the phototropic properties.

TABLE 3

| Sample No. | $\lambda_{max}$ (m$\mu$) | 1. After allowed to stand in a dark place Log $I_1/I_0$ | 2. After irradiated Log $I_2/I_0$ | $\xi_2/\xi_1$ | Isosbestic points of the absorption curves 1 and 2 (m$\mu$) |
|---|---|---|---|---|---|
| HP-1 | 356 | −0.2321 | −0.2097 | 0.90 | 453 |
| HP-2 | 360 | −0.2480 | −0.2125 | 0.86 | 440 |
| HP-3 | 358 | −0.2692 | −0.2441 | 0.90 | 467 |

What is claimed is:

1. A process for the preparation of a polymer having optical specificity which comprises the steps of dissolving vinylphenol in strong alkali solution, adding a diazonium salt solution dropwise thereto to form the monomeric coupled reaction product of said diazonium salt with said vinylphenol, recovering the thus produced monomer from said combined solution, and copolymerizing said monomer with at least one vinyl compound in the presence of a radical polymerization initiator to form a copolymer having optical specificity, said diazonium salt in said diazonium solution being selected from aniline derivatives or naphthylamine derivatives, and said polymerization initiator being selected from the group consisting of azobis-isobutyronitrile and phenylazo-triphenylmethane.

2. A process for the preparation of a polymer having optical specificity which comprises the steps of polymerizing vinylphenol in the presence of a radical polymerization initiator, dissolving the polymer so produced in an alkali solution, and adding at least one diazonium salt solution to the resulting solution to couple with the vinylphenol groups to form a polymer having optical specificity, said vinylphenol is selected from o-vinylphenol or m-vinylphenol, and said polymerization initiator being selected from the group consisting of azobis-isobutyronitrile and phenylazo-triphenylmethane.

3. A process for the preparation of a polymer having optical specificity which comprises the steps of copolymerizing vinylphenol with at least one vinyl monomer capable of copolymerizing with said vinylphenol in the presence of a radical polymerization initiator, dissolving the polymer so produced in an alkali solution, and adding at least one diazonium salt solution to the resulting solution to couple with the vinylphenol groups to form a polymer having optical specificity, said diazonium salt solution being selected from aniline derivatives and naphthylamine derivatives, and said polymerization initiator being selected from the group consisting of azobis-isobutyronitrile and phenylazo-triphenylmethane.

4. A process for the preparation of a polymer having optical specificity which comprises the steps of dissolving vinylphenol in strong alkali solution, adding a diazonium salt solution dropwise thereto to form the monomeric coupled reaction product of said diazonium salt with said vinylphenol, recovering the thus produced monomer from said combined solution, and copolymerizing said monomer with at least one vinyl compound in the presence of a radical polymerization initiator to form a copolymer having optical specificity, said diazonium salt in said diazonium solution being selected from aniline derivatives or naphthylamine derivatives, and said diazonium salt being a diazonium salt of o-toluidine, m-toluidine, p-toluidine, 3,5-dimethylaniline, 3,4,5-trimethylaniline o-chloroaniline, m-chloroaniline, p-chloroaniline, 3,5-dichloroaniline, 3,4,5-trichloroaniline, α-naphthylamine, and β-naphthylamine.

5. A process for the preparation of a polymer having optical specificity which comprises the steps of polymerizing vinylphenol in the presence of a radical polymerization initiator, dissolving the polymer so produced in an alkali solution, and adding at least one diazonium salt solution to the resulting solution to couple with the vinylphenol groups to form a polymer having optical specificity, said vinylphenol being selected from o-vinylphenol or m-vinylphenol, and said diazonium salt being a diazonium salt of o-toluidine, m-toluidine, p-toluidine, 3,5-dimethylaniline, 3,4,5-trimethylaniline, o-chloroaniline, m-chloroaniline, p-chloroaniline, 3,5-dichloroaniline, 3,4,5-trichloroaniline, α-naphthylamine, and β-naphthylamine.

6. A process for the preparation of a polymer having optical specificity which comprises the steps of copolymerizing vinylphenol with at least one vinyl monomer capable of copolymerizing with said vinylphenol in the presence of a radical polymerization initiator, dissolving the polymer so produced in an alkali solution, and adding at least one diazonium salt solution to the resulting solution to couple with the vinylphenol groups to form a polymer having optical specificity, said diazonium salt solution is selected from aniline derivatives and naphthylamine derivatives, and said diazonium salt is a diazonium salt of o-toluidine, m-toluidine, p-toluidine, 3,5-dimethylaniline, 3,4,5-trimethylaniline, o-chloroaniline, m-chloroaniline, p-chloroaniline, 3,5-dichloroaniline, 3,4,5-trichloroaniline, α-naphthylamine, and β-naphthylamine.

7. A phototropic polymer consisting essentially of a saturated hydrocarbon polymer chain having pendant phenol groups which are the coupled reaction products of phenol and at least one diazonium salt selected from the group consisting of the diazonium salts of o-toluidine, m-toluidine, p-toluidine, 3,5-dimethylaniline, 3,4,5-trimethylaniline, o-chloroaniline, m-chloroaniline, p-chloroaniline, 3,5-dichloroaniline, 3,4,5-trichloroaniline, α-naphthylamine, and β-naphthylamine, and said saturated hydrocarbon polymer chain being a polymer of vinylphenol.

8. A phototropic polymer consisting essentially of a saturated hydrocarbon polymer chain having pendant phenol groups which are the coupled reaction products of phenol and at least one diazonium salt selected from the group consisting of the diazonium salts of o-toluidine, m-toluidine, p-toluidine, 3,5-dimethylaniline, 3,4,5-trimethylaniline, o-chloroaniline, m-chloroaniline, p-chloroaniline, 3,5-dichloroaniline, 3,4,5-trichloroaniline, α-naphthylamine, and β-naphthylamine, and said saturated hydrocarbon chain being the homopolymer of vinylphenol.

9. A phototropic polymer consisting essentially of a saturated hydrocarbon polymer chain having pendant phenol groups which are the coupled reaction products of phenol and at least one diazonium salt selected from the group consisting of the diazonium salts of o-toluidine, m-toluidine, p-toluidine, 3,5-dimethylaniline, 3,4,5-trimethylaniline, o-chloroaniline, m-chloroaniline, p-chloroaniline, 3,5-dichloroaniline, 3,4,5-trichloroaniline, α-naphthylamine, and β-naphthylamine, and said saturated hydrocarbon polymer chain being the copolymer of vinylphenol with at least one vinyl monomer selected from the group consisting of methyl acrylate, ethyl acrylate, tert-butyl acrylate, methyl methacrylate, vinyl acetate, acrylonitrile, vinyl chloride, styrene, ethyl vinyl ether, methyl vinyl ether, ethyl vinyl ether and butyl vinyl ether.

* * * * *